United States Patent [19]

Knoerzer et al.

[11] Patent Number: 5,380,586

[45] Date of Patent: Jan. 10, 1995

[54] LOW OXYGEN TRANSMISSIVE FILM

[75] Inventors: Anthony R. Knoerzer; Robert E. Touhsaent, both of Fairport, N.Y.

[73] Assignee: Mobil Oil Corp., Fairfax, Va.

[21] Appl. No.: 80,602

[22] Filed: Jun. 24, 1993

Related U.S. Application Data

[63] Continuation of Ser. No. 812,493, Dec. 23, 1991, abandoned.

[51] Int. Cl.⁶ .................. B32B 7/12; B32B 27/30; B32B 27/42; C08F 8/00
[52] U.S. Cl. .................. 428/349; 428/353; 428/516; 428/518; 525/56; 525/61
[58] Field of Search ........... 428/353, 354, 516, 518, 428/520, 522, 349, 347, 517; 525/61, 56

[56] References Cited

U.S. PATENT DOCUMENTS

| | | | |
|---|---|---|---|
| 2,130,212 | 9/1938 | Watkins | 260/2 |
| 2,333,796 | 11/1943 | Kenyon et al. | 260/73 |
| 2,362,026 | 11/1944 | Quist | 260/90 |
| 2,419,281 | 4/1947 | Noble | 260/90 |
| 2,897,092 | 7/1959 | Miller | 117/47 |
| 2,916,468 | 12/1959 | Yundt | 260/29.6 |
| 3,033,842 | 5/1962 | Holtschmidt | 260/91.3 |
| 3,099,646 | 7/1963 | Scardiglia et al. | 260/91.3 |
| 3,221,079 | 11/1965 | Harris | 260/844 |
| 3,232,916 | 2/1966 | Fogle | 260/91.3 |
| 3,275,575 | 9/1966 | Fogle | 260/2.2 |
| 3,282,729 | 11/1966 | Richardson et al. | 117/138.8 |
| 3,294,577 | 12/1966 | Mayer | 428/502 |
| 3,518,242 | 6/1970 | Chrisp | 260/91.3 |
| 3,702,844 | 11/1972 | Ofstead et al. | 260/91.3 |
| 3,719,621 | 3/1973 | Vogt et al. | 260/30.4 N |
| 3,719,629 | 3/1973 | Martin et al. | 260/33.2 |
| 4,055,698 | 10/1977 | Beery | 428/516 X |
| 4,058,645 | 11/1977 | Steiner | 428/520 X |
| 4,154,912 | 5/1979 | Philipp et al. | 526/7 |
| 4,214,039 | 7/1980 | Steiner et al. | 428/414 |
| 4,224,262 | 9/1980 | Baird, Jr. et al. | 264/22 |
| 4,235,365 | 11/1980 | Yoshii et al. | 229/55 |
| 4,240,993 | 12/1980 | Sun | 264/22 |
| 4,254,169 | 3/1981 | Schroeder | 428/35 |
| 4,254,170 | 3/1981 | Roullet et al. | 428/522 X |
| 4,262,067 | 4/1981 | Philipp et al. | 264/104 X |
| 4,272,470 | 6/1981 | Hsu et al. | 264/104 |
| 4,275,119 | 6/1981 | Weiner | 428/516 |
| 4,276,330 | 6/1981 | Stanley et al. | 428/332 X |
| 4,277,572 | 7/1981 | Fujiwara et al. | 525/61 |
| 4,284,671 | 8/1981 | Cancio et al. | 428/35 |
| 4,288,477 | 9/1981 | Bordini et al. | 428/35 |
| 4,357,402 | 11/1982 | Sheibley et al. | 429/206 |
| 4,363,840 | 12/1982 | Roullet et al. | 428/516 X |
| 4,376,183 | 3/1983 | Haskell | 524/417 |
| 4,416,938 | 11/1983 | Haskell | 428/483 X |
| 4,439,493 | 3/1984 | Hein et al. | 428/414 |
| 4,475,241 | 10/1984 | Mueller et al. | 428/412 X |
| 4,564,559 | 1/1986 | Wagner, Jr. et al. | 428/349 |
| 4,650,721 | 3/1987 | Ashcraft | 428/516 |
| 4,725,646 | 2/1988 | Kobashi et al. | 525/61 |
| 4,731,266 | 3/1988 | Bonnebat et al. | 428/518 X |
| 4,785,049 | 11/1988 | Balaba et al. | 525/61 |
| 4,927,689 | 5/1990 | Markieivicz | 428/34.8 |
| 5,102,699 | 4/1992 | Beeson et al. | 428/483 X |

Primary Examiner—Daniel R. Zirker
Attorney, Agent, or Firm—Alexander J. McKillop; Malcolm D. Keen; Dennis P. Santini

[57] ABSTRACT

A low oxygen transmissive film combination having a substrate with a surface having a surface free energy of at least about 35 dynes/cm, a primer coating on one or both sides and an oxygen transmissive inhibiting layer of a poly(vinyl alcohol) and a cross-linking agent with a proportion of catalytically active sulfuric acid.

12 Claims, No Drawings

LOW OXYGEN TRANSMISSIVE FILM

The present application is a continuation of application Ser. No. 07/812,493 filed Dec. 23, 1991, now abandoned.

BACKGROUND OF THE INVENTION

This invention relates to a flexible, multilayer film having low oxygen transmissive characteristics.

Certain polymeric films employed for the packaging of foods inherently permit the transmission of oxygen from the outside of the film to the inside of a package made up of the film. Oxygen permits rapid deterioration of foods packaged in such a container, therefore, its exclusion or control is desired.

In copending application Ser. No. 07/530,038 filed May 29, 1990 there is described a similar multilayer film having low oxygen transmission characteristics. It is an object of the present invention to further improve upon the ability of such films to exclude oxygen and to improve upon the wet-rubbing resistance of such films.

SUMMARY OF THE INVENTION

In accordance with the present invention, a film combination comprises a polymeric substrate susceptible of transmitting oxygen, at least one side thereof having been treated to a surface-free energy of at least about 35 dynes/cm; said one side having a primer coating thereon; and on said primer coating, an oxygen transmission inhibiting layer of poly(vinyl alcohol) containing a cross-linking agent catalyzed with sulfuric acid.

DESCRIPTION OF THE PREFERRED EMBODIMENTS

The substrates contemplated herein include any polymeric film substrate oriented or unoriented which inherently permits the transmission of oxygen and wherein the utility of such film would call for a minimization of the transmission of oxygen. In most cases, the source of the oxygen referred to herein is atmospheric oxygen. While nylon, polyethylene terephthalate, polycarbonate, etc., films are contemplated herein, a particularly preferred class of films are the polyolefins. Within the polyolefin class, homopolymers and copolymers of propylene are preferred. Particularly preferred are isotactic polypropylenes containing at least 80% by weight of isotactic polypropylene. The preferred base substrate layer can be homopolypropylene having a melting point range of from about 321°–336° F. A commercially available material of this description is ARCO W472. The preferred substrate can also be coextruded with a thin skin layer, amounting to from about 2 to about 12% of the total thickness, of a copolymer of propylene and another olefin, e.g., ethylene, butene-1, etc. The other olefin can be present in the copolymer in an amount of from about 1–7 wt %.

In order to effectively inhibit the amount of oxygen transmitted through the base layer, the base layer must be 1) treated to a surface free energy of at least about 35 dynes/cm, 2) have a primer coating applied thereto, and 3) have a coating on the primer of an oxygen transmission inhibiting layer of poly(vinyl alcohol) containing a cross-linking agent catalyzed with sulfuric acid.

The preferred substrate must be properly prepared to receive the primer layer followed by the cross-linked poly(vinyl alcohol). This proper treatment involves treating the surface to a surface tension level of at least about 35 and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred with corona discharge treatment being particularly preferred.

Commercially available corona discharge treatment equipment can be obtained from Solo Systems, Inc., Garland, Tex.; Corotec Corporation, Collinsville, Conn.; Softal Electronics, Hamburg, W. Germany; and others. Using, for example, Softal Electronics equipment, a treater can have an air gap of about 0.050 in. when treating polypropylene film of about 0.9 mils. The film can be treated to 42–44 dynes/cm.

After this treatment, a suitable primer material is coated onto the treated surface.

Preferred primer materials are those disclosed in U.S. Pat. No. 4,564,559. These include a primer produced by condensing a monoaldehyde with an interpolymer of acrylamide or methacrylamide and at least one other unsaturated monomer. Further included is a material resulting from condensing aminoaldehyde with acrylamide or methacrylamide and subsequently interpolymerizing the condensation product with at least one other unsaturated monomer in the presence of a $C_1$–$C_6$ alkanol. A preferred primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. Another primer resin of this type is a 50% solid solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

A particularly preferred primer material for the structure contemplated herein has been found to be poly(ethyleneimine). The imine primer provides an overall adhesively active surface for thorough and secure bonding with the subsequently applied cross-linked poly(vinyl alcohol). It has been found that an effective coating solution concentration of the poly(ethyleneimine) applied from either aqueous or organic solvent media, such as ethanol, is a solution comprising about 0.1–0.6% by weight of the poly(ethyleneimine). A commercially available material of this type is known as Polymin P, a product of BASF-Wyandotte Corporation.

Another particularly preferred primer material is the reaction product of an epoxy resin, as a first component with an acidified aminoethylated vinyl polymer, as the second component. The contemplated epoxy resins are glycidyl ethers of polyhydroxy compounds. Typical polyhydroxy compounds which may be used include bisphenol A, ring-substituted bisphenol A, resorcinol, hydroquinone, phenol-formaldehyde, Novolac resins, aliphatic diols, such as ethylene glycol, propylene glycol, 1,4-butanediol, 1,6-hexane-diol, glycerol, lower alkyl hydantoins and mixtures thereof. The preferred epoxy resins of the present invention are those made by the glycidation reaction between epichlorohydrin and bisphenol A. Epoxy resins of this type are commonly classified by their epoxy equivalent weight (EEW) which is defined by the weight of resin in grams which contains one gram equivalent of epoxy groups. Resins with an EEW ranging from 170 to 280 may be used in the present invention, but the preferred range is 180 to 210.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer composition of the present invention is an amino modified acrylic polymer which is water soluble. This polymer is a curing agent for the epoxy compound. The preferred material is described in U.S. Pat. No. 3,719,629, the disclosure of which is incorporated herein by reference. This material may be generically described as an acidified aminoethylated interpolymer having pendent aminoalkylate groups. This material is produced by polymerizing acrylate, methacrylate, styrene or other suitable monomers with sufficient methacrylic or acrylic acids to give a —COOH content of about 7.5 to about 12.5%. Solvent polymerization techniques are preferred. The polymer is then reacted with ethyleneimine monomer and acidified with hydrochloric acid to render the polymer water-soluble.

In one embodiment of the present invention, a liquid epoxy resin is emulsified in a solution of the curing agent by rapid stirring, the resultant dispersion is diluted with water to the desired concentration for coating, usually from about 2 to about 20% solids. When mixing the epoxy resin with the curing agent, it is generally preferred to use a stochiometric equivalent balance of epoxy and amine groups. However, it has been found that the stochiometric ratio may be varied over a wide range, from about 1 epoxy to about 3 amine groups through 3 epoxy groups to 1 amine group. Any of the above described primers can be employed in the range of about 0.001 to 3.5 g/m$^2$.

The poly(vinyl alcohol) employed herein can be any commercially available material. For example, ELVANOL 71-30, an E. I. dupont product. The poly(vinyl alcohol) coating solution is prepared by dissolving the polymer in hot water, cooling and mixing both with a suitable cross-linking agent and sulfuric acid as the catalyst. The cross-linking agent can be a melamine- or urea-formaldehyde resin. Commercially available cross-linkers also would include PAREZ 613, a methylated melamine formaldehyde; CYMEL 373, a methylated melamine formaldehyde; CYMEL 401, a trimethylol melamine urea formaldehyde; glyoxal, borax, etc. Sulfuric acid as the cross-linker catalyst has been discovered to be far superior to nitric acid, ammonium chloride and ammonium nitrate.

Cross-linking is carried out to make the poly(vinyl alcohol) less moisture sensitive but it is essential that this does not occur before the coating weight is applied and evenly distributed. This is effected by making up the aqueous solution so that the initial concentration is too low for this to occur but, as drying occurs, the concentration increases and the rate of cross-linking is heightened.

Suitable concentrations have been found to be from 1 to 35, preferably from 4 to 8 wt % of the solution, being polymer plus cross-linking agent plus sulfuric acid in a catalytically active amount. If the solids content is higher, the solution becomes too viscous; if lower, good water resistance is not obtained. From about 5% to 30%, typically 15% cross-linking agent is used with from 0.1% to 7.5%, typically 2% of the sulfuric acid catalyst. A preferred formulation comprises the following solids content: 85.5 wt % poly(vinyl alcohol); 12.8 wt % methylated melamine formaldehyde; and 1.7 wt % sulfuric acid. The sulfuric acid employed can have a strength ranging from about 0.1 to 1.0, molarity. A catalytically active amount can range from 0.1 to 20 wt. %.

The aqueous poly(vinyl alcohol) solutions were prepared by dissolving sufficient ELVANOL 71-30 in hot water to form 8 wt % solutions which were then cooled. To these solutions were added a 20 wt % aqueous melamine formaldehyde solution and the appropriate amount of aqueous ammonium chloride solutions and sulfuric acid solutions to provide the formulations shown in the Table below. The cross-linked poly(vinyl alcohol) can be present in from about 0.2 to 3 g/m$^2$.

Examples

Samples as shown in the following Table were prepared as follows:

A homopolymer polypropylene core is coextruded with skin layers of an ethylene-propylene random copolymer. The random copolymer contains approximately 3–5% by weight of ethylene. The extruded film is biaxially oriented to 4–5 times machine direction and 7–10 times transverse direction to yield a film having a thickness of approximately 1 mil. The thickness of the skin layers is approximately 12% of the film and are approximately of equal thickness. This film combination is corona discharge treated in accordance with commonly employed prior art techniques to produce a surface with a wetting tension of about 42 dynes/cm. The treated film is precoated on both sides with 0.1 wt % poly(ethyleneimine), i.e., the above-identified BASF-Wyandotte Corporation Polymin P product. The film is air-dried at 100° C. This coating weight is too low to be measured, but is calculated to be in the range of 0.002 grams per m$^2$. This primer coated treated substrate is then coated on one side with an acrylate coating to a coating weight of about 1.0 g/m$^2$. If PVOH is applied first, the barrier is improved. This is due to the additional heat that is used to dry the acrylic heat seal layer. This acrylate coating is an aqueous ammoniacal solution of terpolymer latex resulting from the polymerization of about 56% by weight of methyl methacrylate, about 40% by weight of methyl acrylate, and about 4% by weight of methacrylic acid. The opposite surface of this film structures was coated with the appropriate solution of poly(vinyl alcohol), cross-linking agent and catalyst. The solutions were applied utilizing a reverse direct gravure coater and the coated film is passed through a dry-air oven at from 100°–125° C. This produces a coating weight of 0.5 g/m$^2$.

The dried films are then tested in an oxygen-permeability device in which a stream of dry oxygen is passed through an aqueous salt solution-permeated pad to control the gas moisture content and then through the films, disposed at right angles to the stream, with the cross-linked poly(vinyl alcohol) coating upstream. The oxygen transmitted was determined and the amount of oxygen passed per unit area of film per time period is calculated. The sulfuric acid catalyzed systems are superior to any other catalyzed system for inhibiting the transmission of oxygen through a packaging type film. The rubbing resistance of the sulfuric acid catalyzed systems are also outstanding as shown by the data of the Table.

TO2 AND RUBBING RESISTANCE OF PVOH COATING (H2SO4 vs HN4Cl)

| Sample Code | Catalyst (phr) | P 613* Xlink (phr) | Rubbing Resistance** 0 WK | 1 WK | 3 WK | TO2 (cc/100 in²) at 75% RH 1 WK | 3 WK | App. 50% RH |
|---|---|---|---|---|---|---|---|---|
| C2388L | NH4CL: 2.0 | 15 | 100 | 70 | 50 | 7.07 | — | |
| C2389L | NH4CL: 2.0 | 15 | 100 | 70 | 50 | 9.94 | — | |
| Virton P | NH4CL: 2.5 | 20 | 70 | 70 | 70 | 8.63 | — | 8.5–50.0 |
| 180-01P | H2SO4: 2.0 | 15 | 50 | 30 | 0 | 4.19 | 3.53 | |
| 220-01P | H2SO4: 2.0 | 25 | 50 | 50 | 0 | 4.69 | 3.86 | |
| L9-05P | H2SO4: 2.0 | 20 | 50 | 30 | 0 | 3.14 | 3.24 | |
| L9-10P | Nil | Nil | 100 | 100 | 100 | 4.64 | 7.03 | |
| L9-11P | H2SO4: 3.0 | 20 | 10 | 0 | 0 | 1.69 | 2.78 | |

*Parez 613, a methylated melamine formaldehyde
**% removed

The cross-linked poly(vinyl alcohol) coated films described above are intended to be adhesively laminated to either oriented or unoriented commercially available thermoplastic films such as homopolymer polypropylene film, polypropylene with coated layers, polypropylene with slip additives, polypropylene with coextruded layers, opaque polypropylene, polyethylene, Nylon, polyethylene terephthalate, polycarbonate, polystyrene, etc. A particularly preferred class of films are the polyolefins.

Although the present invention has been described with preferred embodiments, it is to be understood that modifications and variations may be resorted to without departing from the spirit and scope of this invention. Such variations and modifications are considered to be within the purview and scope of the appended claims.

What is claimed is:

1. A polymeric film having reduced oxygen transmissive characteristics produced by the process comprising:
   coating at least one side of a polymeric substrate adapted for receipt of an oxygen barrier with a solution of poly (vinyl alcohol), a cross-linking agent selected from the group consisting of urea formaldehyde, melamine formaldehyde, methylated melamine formaldehyde and trimethylol melamine urea formaldehyde, and an acid catalyst; and
   cross-linking said poly (vinyl alcohol) to provide said oxygen barrier, said acid catalyst being sulfuric acid.

2. The film according to claim 1, wherein said formaldehyde-containing cross-linking agent is methylated melamine formaldehyde.

3. The film according to claim 1, wherein said oxygen barrier includes from about 5% to about 30% by weight of said cross-linking agent.

4. The film according to claim 1, wherein said solution is aqueous.

5. The film according to claim 4, wherein said aqueous solution is prepared by the steps of:
   a) adding said poly(vinyl alcohol) to water of sufficient temperature to dissolve said poly(vinyl alcohol);
   b) cooling said water and dissolved poly(vinyl alcohol); and
   c) adding an effective amount of said cross-linking agent and said acid catalyst to said cooled water to provide said aqueous solution.

6. The film according to claim 5, further comprising the step of drying said aqueous solution to remove water therefrom and facilitate cross-linking of said poly(vinyl alcohol).

7. The film according to claim 5, wherein said aqueous solution includes a solid content comprising from about 5% to about 30% by weight of said cross-linking agent and from 0.1% to about 7.5% by weight of said acid catalyst.

8. A polymeric film having reduced oxygen transmissive characteristics produced by the process comprising:
   providing a polymeric substrate having at least one side which has been treated to a surface tension level of at least about 35 dynes/cm;
   applying a primer coating to said at least one side; and
   coating said at least one side with an aqueous solution of poly(vinyl alcohol), cross-linking agent and acid catalyst and thereafter allowing said poly(vinyl alcohol) to cross-link to provide an effective oxygen barrier, said acid catalyst being sulfuric acid and said cross-linking agent being selected from the group consisting of urea formaldehyde, melamine formaldehyde, methylated melamine formaldehyde and trimethylol melamine urea formaldehyde.

9. The film according to claim 8, wherein said oxygen barrier includes from about 5% to about 30% by weight of said cross-linking agent.

10. The film according to claim 8, wherein said primer comprises poly(ethyleneimine).

11. The film according to claim 8, wherein said substrate comprises a polyolefin.

12. The film according to claim 8, further comprising an acrylic heat seal layer adhered to one side of said polymeric substrate.

* * * * *